(No Model.)
F. V. DE COPPET.
ICE MACHINE.
No. 351,368. Patented Oct. 26, 1886.
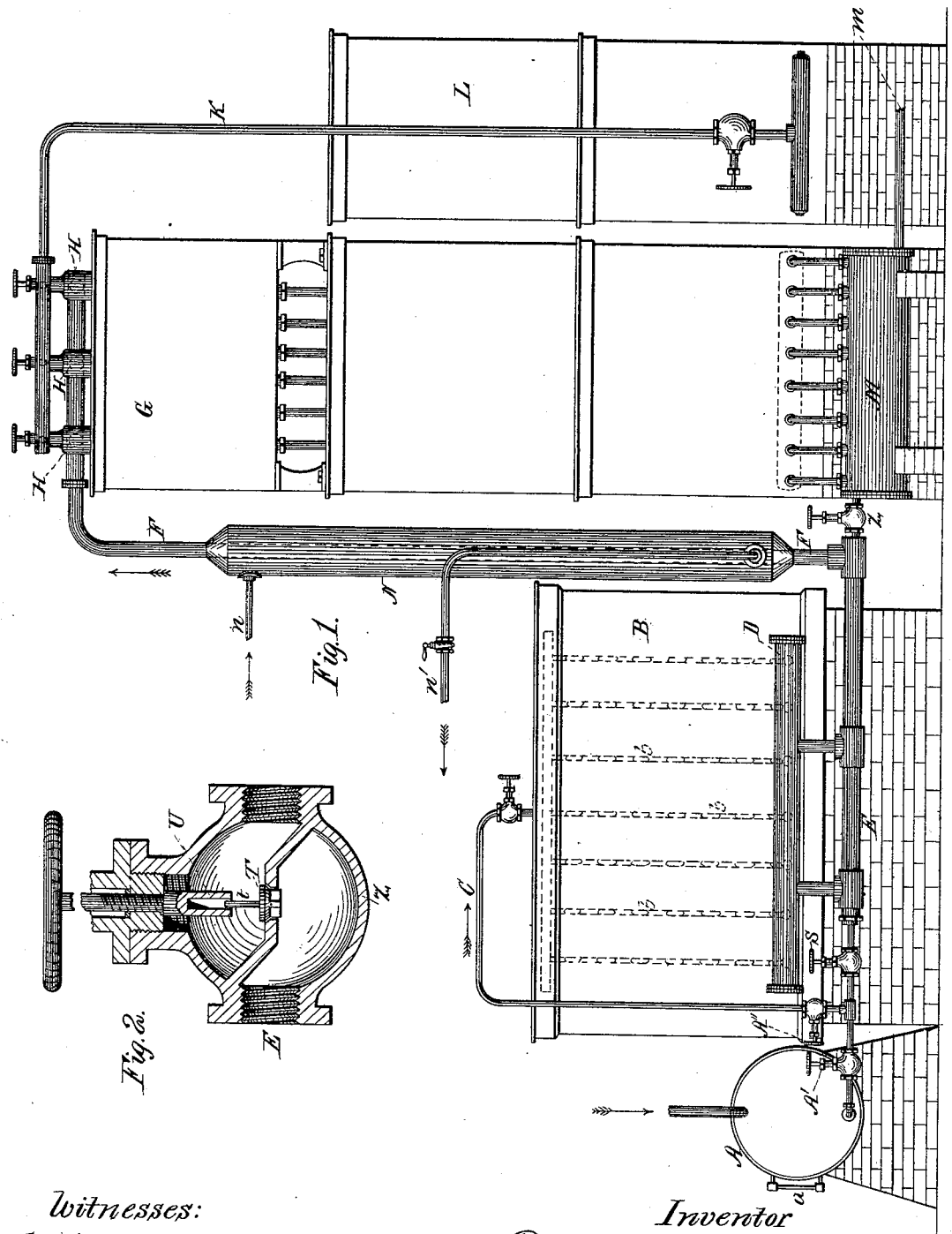
Witnesses:
W. C. Jirdinston.
E. W. Rector.
Inventor
Francis V. De Coppet
by Skinn & Peck
his Attorneys.

UNITED STATES PATENT OFFICE.

FRANCIS V. DE COPPET, OF CINCINNATI, OHIO.

ICE-MACHINE.

SPECIFICATION forming part of Letters Patent No. 351,368, dated October 26, 1886.

Application filed January 20, 1886. Serial No. 189,161. (No model.)

*To all whom it may concern:*

Be it known that I, FRANCIS V. DE COPPET, a citizen of the United States, residing at Cincinnati, in the county of Hamilton and State of Ohio, have invented certain new and useful Improvements in Absorption Ice or Refrigerating Machines, of which the following is a full, clear, and exact description, reference being had to the accompanying drawings, forming a part of this specification.

My invention relates to an improvement in absorption ice or refrigerating machines, and has for its object the removal or prevention of what are known as "projections" in the pipes.

It sometimes happens that the retort containing the aqua-ammonia from which the ammonia-gas is generated is overheated or overcharged, so that more or less steam or watery vapor is carried over with the gas and passes through the condenser into the reservoir or vessel containing the liquid gas and thence into the refrigerating-coils, where it seriously retards the freezing and clogs the pipes. This is sometimes called a "projection." Several plans have been adopted for removing this water from the refrigerating-coils and the liquid-gas tank. It is sometimes blown out. This, however, stops the machine and seriously retards its work. It has also been attempted to pump it out, but without success. I remove it by collecting all the water or impurities that have passed into the refrigerating-coil in what may be termed a "purge-pipe," which opens by a check-valve into the rich-liquor vase, and is sufficiently inclined to drain into the rich-liquor vase; or by connecting the purge-pipe with the liquid-gas tank and the rich-liquor vase by suitable cocks any water in the liquid-gas tank or purge-pipe can be drawn or driven out into the rich-liquor vase and pumped back as rich aqua-ammonia to the retort or still.

In the accompanying drawings, Figure 1 is an elevation of those parts of an absorption-machine necessary to illustrate my invention, the still, condenser, and pumps not being shown, as they have no immediate connection with or novel relation to my invention. Fig. 2 is a sectional view of the check-valve shown at Z, Fig. 1.

The same letters of reference are used to indicate identical parts in all the figures.

A represents the tank or the recipient of the liquefied gas, which has been condensed in the usual manner. The glass gage $a$ indicates the condition of its contents and shows the amount of water, or, more properly speaking, aqua-ammonia, which has been carried over with the gas from the still in the form of steam or watery vapors.

B is the freezing-tank, the coils being indicated by the dotted lines $b$. The cocks A' A" being opened, the liquefied gas passes from the liquid-gas tank A into the freezing-coils through the pipe C. The usual course of this gas is to pass through the refrigerator-coils, expanding and absorbing heat; thence through the manifold D and pipes E and F to the absorber G. In the mixers H H H this expanded gas meets the poor liquor carried by the pipe K from the retort after having been cooled in the cooling-tank L. The reabsorption of the expanded gas with the impoverished liquor then takes place in the manner described in the application of Messrs Alford, Rinman, and myself, filed at the same time as this. From the absorber it passes, in the manner described, to the rich-liquor vase M, from which it is pumped through the pipe $m$ to the retort or still, as required.

The gas-pipe F is surrounded with a water-jacket, N, to which water is admitted through the pipe $n$ and escapes from the pipe $n'$, for the purpose of cooling the expanded gas before it reaches the mixer H.

Whenever a projection has occurred and watery vapors pass over with the gas, if they reach the refrigerating-coils they are condensed of course, and collect by gravity in the manifold D and flow into the purge-pipe E, which is inclined so as to drain into the rich-liquor vase M. This rich-liquor vase contains the rich aqua-ammonia produced by the uniting of the gas and poor liquor in the mixer H and absorber G. Of course any liquid in the pipe E consists of aqua-ammonia, which is thus discharged direct into the rich-ammonia reservoir and saved.

Whenever water accumulates in the liquid-gas tank A by the condensation of steam carried with the gas from the still, the cock A" is closed and the cocks S and Z opened, when the expansive force of the liquid gas in the tank A drives the water or aqua-ammonia at the bottom of the tank A through the pipe E E into the rich-liquor vase M, of course driving with it any projections which may have collected in the pipe E E from the refrigerating-coils.

In the check-valve T, (shown in detail in Fig. 2,) the valve proper, T, is provided with an arm, $t$, which works loosely in the socket of the stem U. When the valve is opened, as shown in Fig. 2, the pressure in the pipe E lifts the valve T. The moment the pressure in the rich-liquor vase exceeds the pressure in the pipe E the valve is closed, thus effectually checking any backflow from M to E.

Having thus fully described my invention, I claim—

1. In an absorption ice or refrigerating machine, a purge-pipe so connected with the liquid-gas tank and the rich-liquor vase that all water or impurities in the liquid gas may be forced into the rich-liquor vase without passing through the refrigerating-coil.

2. In an ice-machine, a purge-pipe connected with and draining the refrigerating-coil, and emptying into the rich-liquor vase, substantially as and for the purpose described.

3. In an ice-machine, the check-valve T between the rich-liquor vase and the purge-pipe E, substantially as described.

4. In an ice-machine, the pipe F, conveying the expanded gas to the mixer H, and surrounded with the water-jacket N, substantially as described.

5. In an ice-machine, a manifold for collecting the water in the refrigerating-coil and discharging it by gravity into a pipe connected by suitable valves with the liquid-gas tank and the rich-liquor vase, substantially as and for the purpose specified.

6. In an ice-machine, a purge-pipe draining the refrigerating-coils and carrying any water or aqua-ammonia from them direct to the rich-liquor vase, substantially as described.

FRANCIS V. DE COPPET.

Witnesses:
WM. D. ALFORD,
E. W. RECTOR.